7597X

May 28, 1833

Elijah Skinner and John Webster
Letters Patent

The Schedule referred to in these Letters Patent and making part of the same containing a description in the words of the said Elijah Skinner and John Webster themselves of their Improvement in Composition for Painting called the "Stone Composition".

---

To all to whom these presents shall come. Be it known that we Elijah Skinner & John Webster of Sandwich in the County of Strafford & State of New Hampshire have invented a new & useful composition for painting called the "Stone Composition" & that the following is a full & exact description of the preparation & use of said composition as invented or improved by us. This composition is prepared by taking common free stone or soap stone well ground & bolted & common white lead in equal quantities which when well mixed together may be ground in oil in the ordinary manner of grinding oil paints with the usual and necessary drying. We also contemplate mixing and using said stone with other kinds of paints of different colors whether with or without oil & in such proportions as may be necessary, or using said stone alone for the purpose of painting. But we consider the use of said stone of the most consequence in paint that is designed to be exposed to the weather especially in white lead. What we claim as new is the introduction of this particular species of stone into the common composition of paints. Sandwich N. H. April 27 1833

Witnesses

Ira A. Dean
[illegible] W. Hilton

Elijah Skinner
John Webster

270 [illegible]

E. S.
[illegible]